(12) United States Patent
Chen

(10) Patent No.: US 9,907,031 B2
(45) Date of Patent: *Feb. 27, 2018

(54) BASE STATION, MOBILE STATION, WIRELESS COMMUNICATIONS SYSTEM, AND WIRELESS COMMUNICATIONS METHOD

(71) Applicant: FUJITSU LIMITED, Kawasaki-shi, Kanagawa (JP)

(72) Inventor: Hongyang Chen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,364

(22) Filed: May 15, 2017

(65) Prior Publication Data

US 2017/0251436 A1    Aug. 31, 2017

Related U.S. Application Data

(63) Continuation of application No. 15/388,687, filed on Dec. 22, 2016, now Pat. No. 9,686,755, which is a
(Continued)

(51) Int. Cl.
  *H04W 4/00* (2009.01)
  *H04W 52/32* (2009.01)
  (Continued)

(52) U.S. Cl.
  CPC .... *H04W 52/325* (2013.01); *G06F 17/30952* (2013.01); *H04L 1/00* (2013.01);
  (Continued)

(58) Field of Classification Search
  CPC . H04W 52/325; H04W 52/16; H04W 52/226; H04W 52/143; H04W 52/48; H04L 1/00; H04L 1/08
  See application file for complete search history.

(56) References Cited

U.S. PATENT DOCUMENTS 6,181,944 B1 * 1/2001 Uebayashi ............... G01S 5/14
                                                455/456.2
9,166,719 B2   10/2015 Seo et al.
(Continued)

FOREIGN PATENT DOCUMENTS

EP      1 624 629 A2    2/2006
EP      1 898 544 A1    3/2008
(Continued)

OTHER PUBLICATIONS

International Search Report issued for corresponding International Patent Application No. PCT/JP2013/076154, dated Nov. 26, 2013.
(Continued)

*Primary Examiner* — Dominic Rego
(74) *Attorney, Agent, or Firm* — Myers Wolin, LLC

(57) ABSTRACT

At a base station, a table is prepared that for each index value among multiple different index values, associates repetition counts of different channels correlated with each other. The base station acquires reception information indicating a reception state of a wireless signal at a mobile station, determines a repetition count for each channel based on the reception information, and acquires from the table, an index value corresponding to the respective repetition counts for the channels. The base station transmits to the mobile station, a wireless signal that includes the index value to notify the mobile station of the index value. The mobile station has a table that for each index value among different index values, associates repetition counts of different channels correlated with each other and acquires the repetition counts of the channels from the table, based on the index value from the base station.

14 Claims, 16 Drawing Sheets

Related U.S. Application Data continuation of application No. 15/066,585, filed on Mar. 10, 2016, now Pat. No. 9,596,661, which is a continuation of application No. PCT/JP2013/076154, filed on Sep. 26, 2013.

(51) Int. Cl.
  *H04L 1/00* (2006.01)
  *H04W 52/16* (2009.01)
  *H04W 52/22* (2009.01)
  *H04L 1/08* (2006.01)
  *H04W 52/14* (2009.01)
  *H04W 52/48* (2009.01)
  *G06F 17/30* (2006.01)

(52) U.S. Cl.
  CPC ............. *H04L 1/08* (2013.01); *H04W 52/143* (2013.01); *H04W 52/16* (2013.01); *H04W 52/226* (2013.01); *H04W 52/48* (2013.01)

(56) References Cited

U.S. PATENT DOCUMENTS

| | | |
|---|---|---|
| 2003/0137950 A1 | 7/2003 | Kim et al. |
| 2006/0280262 A1 | 12/2006 | Malladi |
| 2007/0077922 A1 | 4/2007 | Kim et al. |
| 2008/0225725 A1 | 9/2008 | Wang et al. |
| 2008/0291981 A1* | 11/2008 | Jonsson ................. H04B 1/712 375/148 |
| 2010/0120476 A1 | 5/2010 | Zettler et al. |
| 2010/0142630 A1 | 6/2010 | Kuri et al. |
| 2010/0246518 A1 | 9/2010 | Gheorghiu et al. |
| 2010/0296460 A1 | 11/2010 | Akimoto et al. |
| 2011/0199905 A1 | 8/2011 | Pinheiro et al. |
| 2013/0136072 A1 | 5/2013 | Bachmann et al. |
| 2013/0143594 A1 | 6/2013 | Ghabra et al. |
| 2013/0250863 A1 | 9/2013 | Nogami et al. |
| 2015/0288490 A1 | 10/2015 | Sun et al. |
| 2016/0241371 A1* | 8/2016 | Kim .................... H04W 24/10 |

FOREIGN PATENT DOCUMENTS

| | | |
|---|---|---|
| EP | 2 369 883 A1 | 9/2011 |
| JP | 2000-41283 A | 2/2000 |
| JP | 2004-40758 A | 2/2004 |
| JP | 2009-290451 A | 12/2009 |
| JP | 2012-165449 A | 8/2012 |
| JP | 2012-178872 A | 9/2012 |
| JP | 2012-522427 A | 9/2012 |
| JP | 2013-520100 A | 5/2013 |
| JP | 2013-524563 A | 6/2013 |
| WO | 2007/013561 A1 | 2/2007 |
| WO | 2010/111429 A2 | 9/2010 |
| WO | 2011/100540 A1 | 8/2011 |

OTHER PUBLICATIONS

Extended European search report with supplementary European search report and the European search opinion issued by the European Patent Office for corresponding European Patent Application No. 13894555.5, dated Sep. 1, 2016.
Notice of Preliminary Rejection issued by the Korean Intellectual Property Office for corresponding Korean Patent Application No. 10-2016-7006683, dated Mar. 9, 2017, with partial English translation.
Non-Final Office Action issued by the United States Patent and Trademark Office for corresponding U.S. Appl. No. 15/388,687, dated Jan. 23, 2017.

* cited by examiner

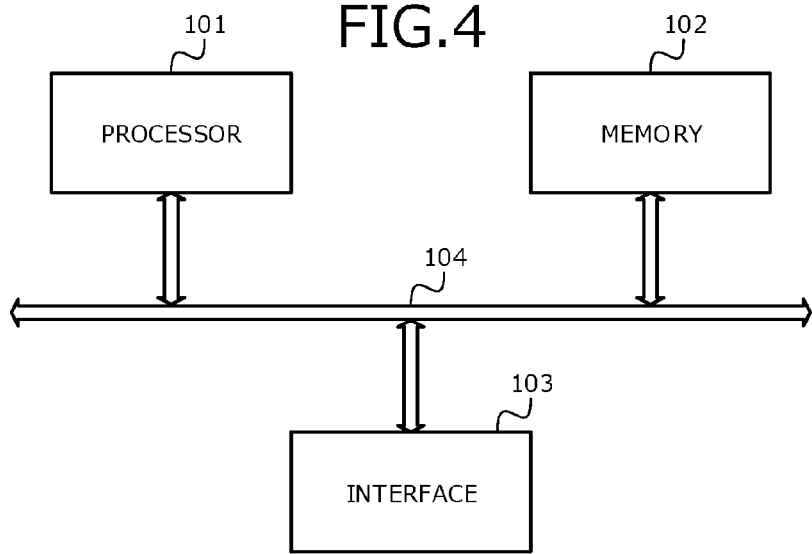
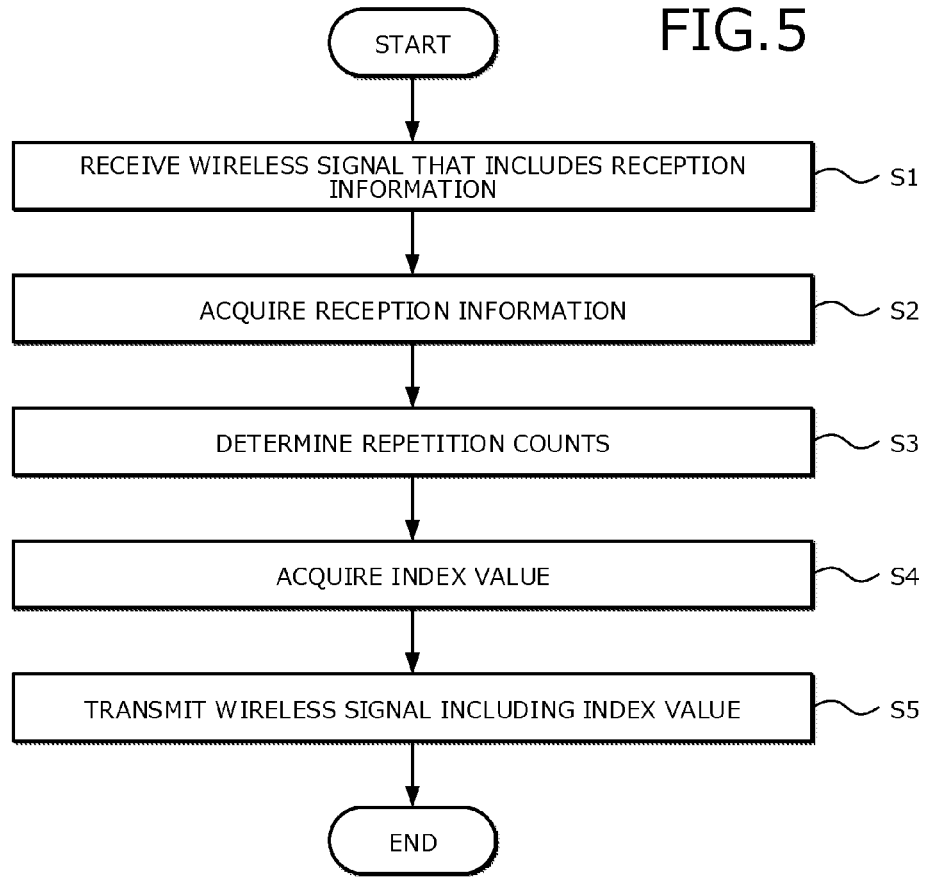

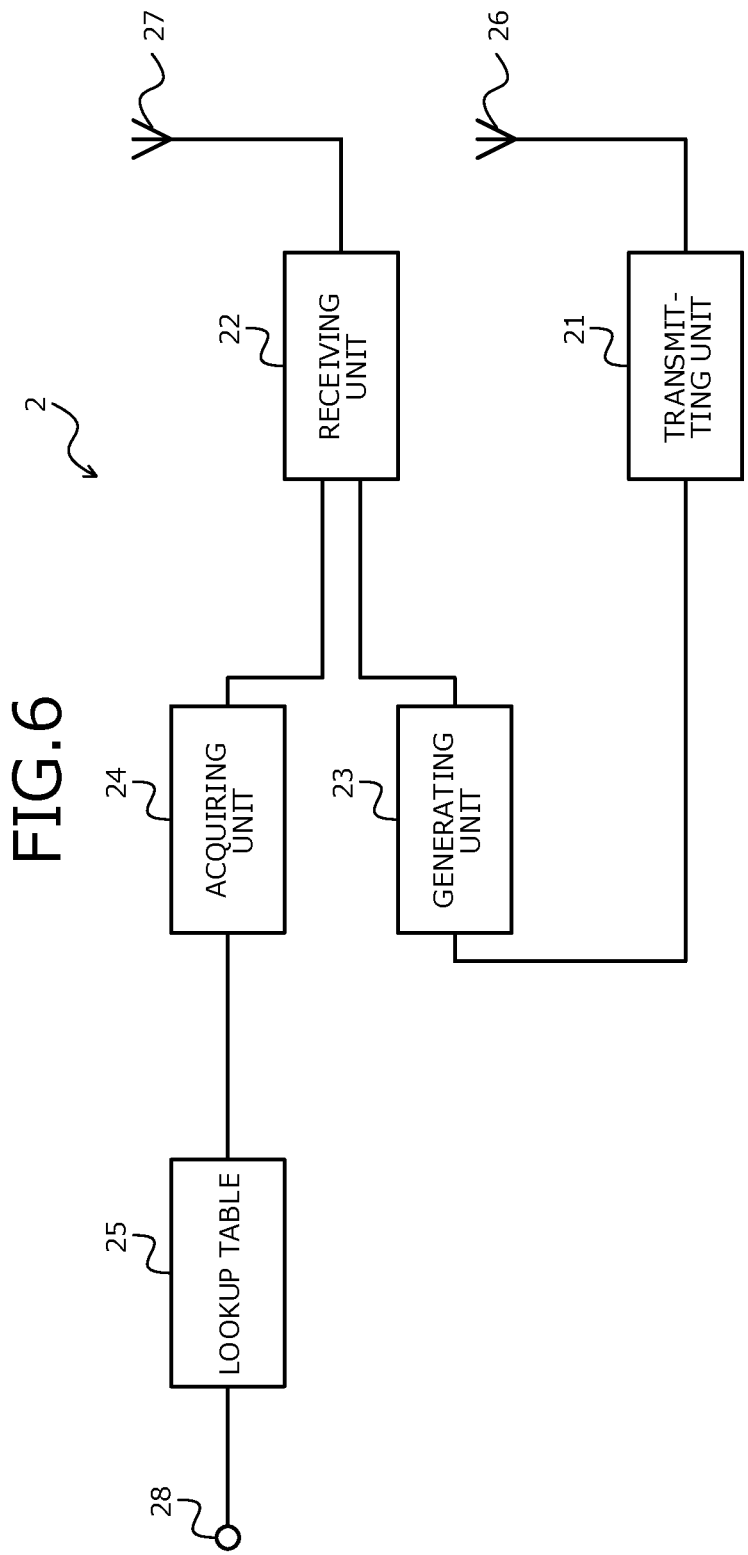

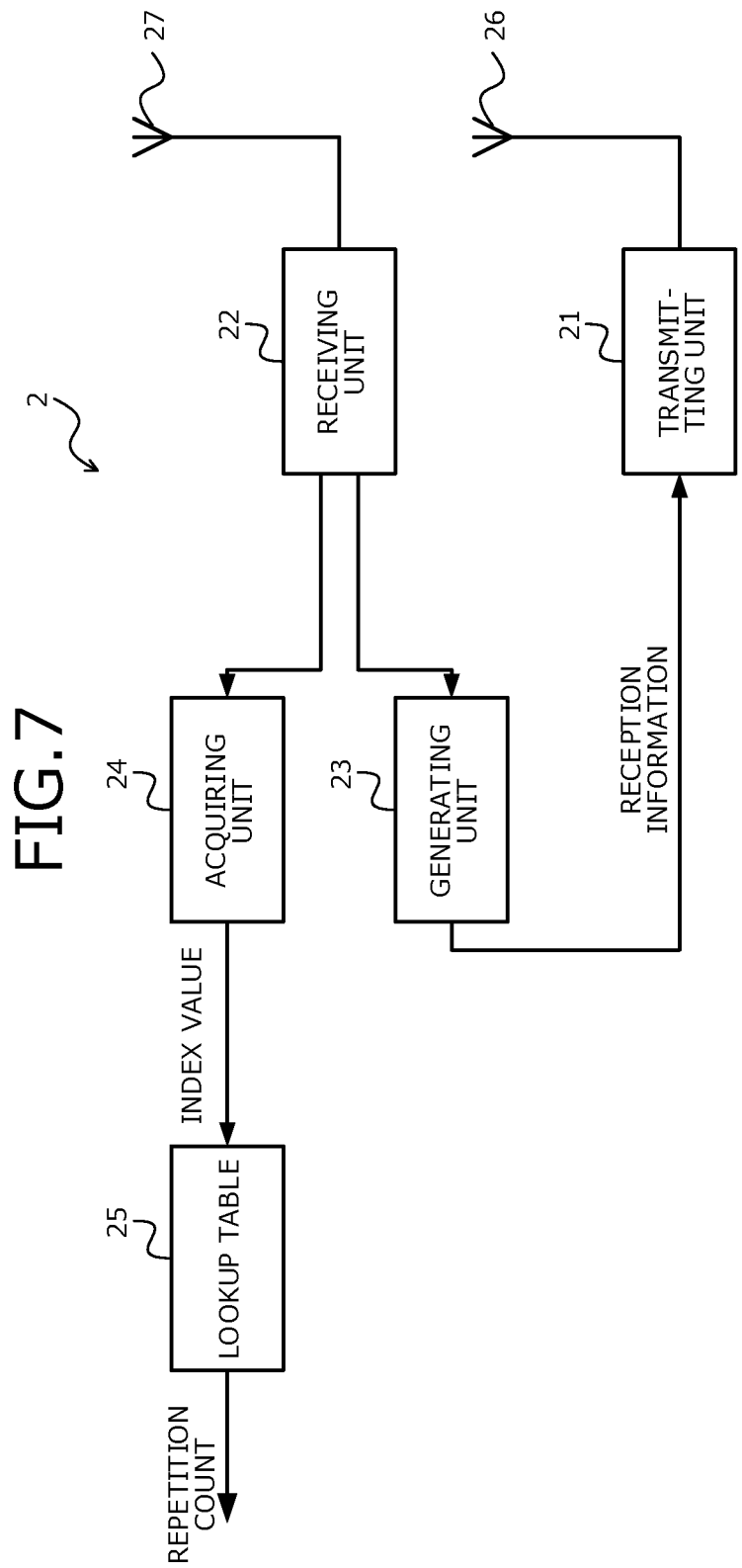

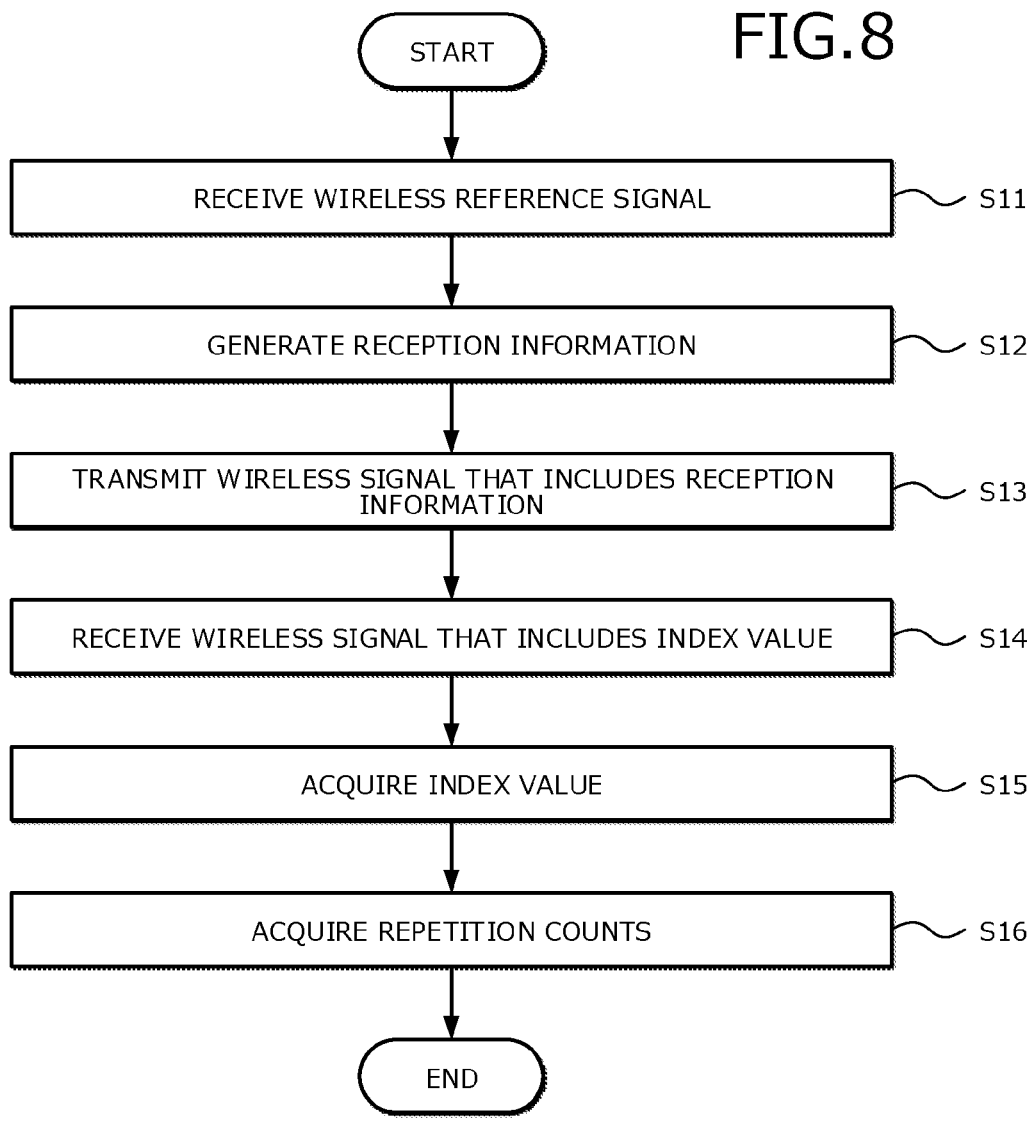

FIG.9

| PHYSICAL CHANNEL | PUCCH (1a) | PRACH | PUSCH | PDSCH | PBCH | SCH | PDCCH (1A) |
|---|---|---|---|---|---|---|---|
| MCL (FDD,2×2eNB) | 147.2dB | 141.7dB | 140.7dB | 145.4dB | 149.0dB | 149.3dB | 146.1dB |
| MCL (TDD,8×8eNB) | 149.4dB | 146.7dB | 147.4dB | 148.1dB | 149.0dB | 149.3dB | 146.9dB |

FIG.10

| PHYSICAL CHANNEL | REQUIRED COVERAGE EXPANSION LEVEL | REPETITION COUNT | POWER BOOST |
|---|---|---|---|
| PHYCH1 | 10dB | 10 | 0dB |
| PHYCH2 | 10dB | 4 | 4dB |
| PHYCH3 | 12dB | 4 | 6dB |

FIG.13

| INDEX VALUE | SINR VALUE | REPETITION COUNT REFERENCE VALUE (PDSCH) | REPETITION COUNT CORRECTION VALUE (PDSCH) | REPETITION COUNT REFERENCE VALUE (PDCCH) | REPETITION COUNT CORRECTION VALUE (PDCCH) |
|---|---|---|---|---|---|
| 0 | $SINR_0$ | $RL_{PDSCH,0}$ | $RL_{PDSCH,0} \times a_{PDSCH}$ | $RL_{PDCCH,0}$ | $RL_{PDCCH,0} \times a_{PDCCH}$ |
| 1 | $SINR_1$ | $RL_{PDSCH,1}$ | $RL_{PDSCH,1} \times a_{PDSCH}$ | $RL_{PDCCH,1}$ | $RL_{PDCCH,1} \times a_{PDCCH}$ |
| 2 | $SINR_2$ | $RL_{PDSCH,2}$ | $RL_{PDSCH,2} \times a_{PDSCH}$ | $RL_{PDCCH,2}$ | $RL_{PDCCH,2} \times a_{PDCCH}$ |
| ... | ... | ... | ... | ... | ... |
| 15 | $SINR_{15}$ | $RL_{PDSCH,15}$ | $RL_{PDSCH,15} \times a_{PDSCH}$ | $RL_{PDCCH,15}$ | $RL_{PDCCH,15} \times a_{PDCCH}$ |

37

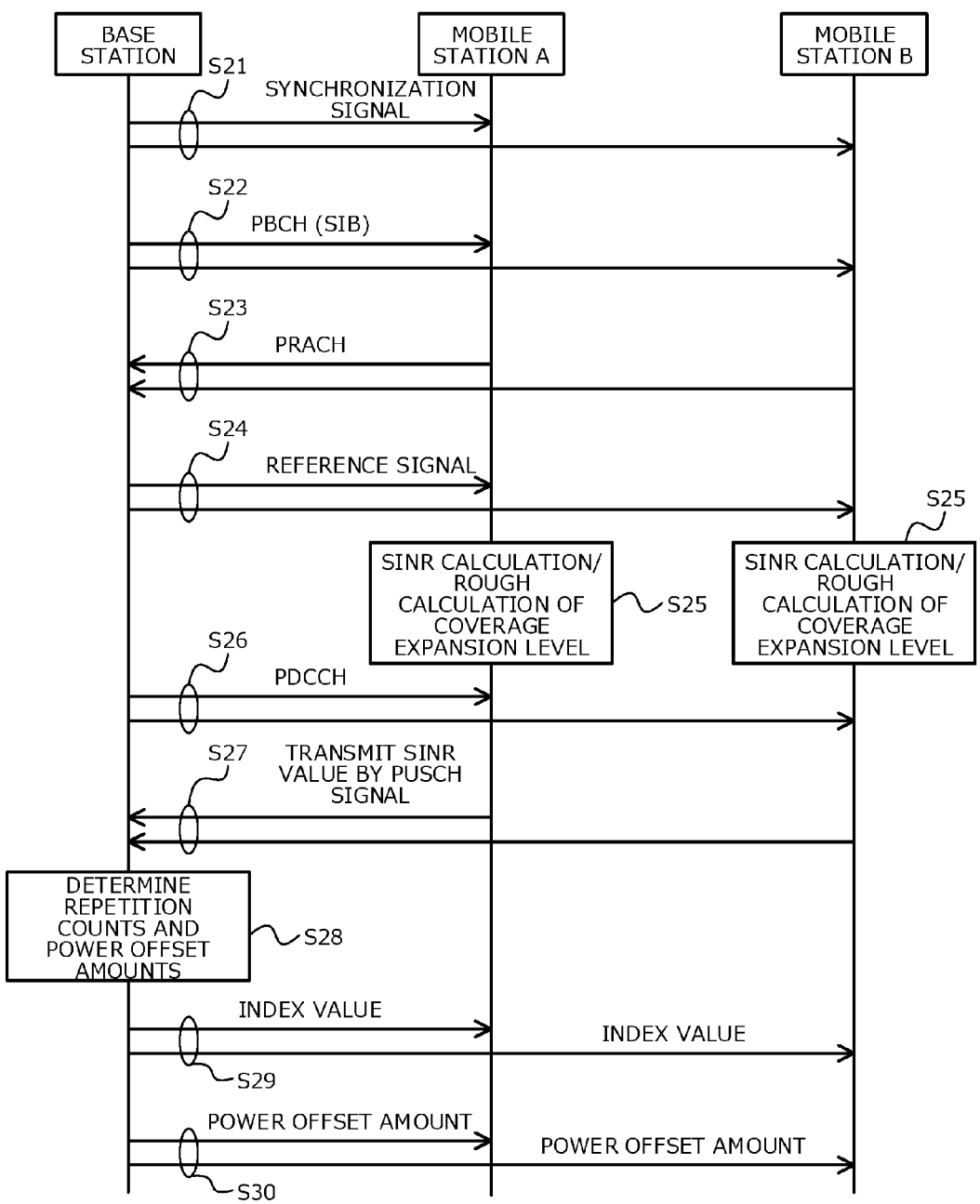

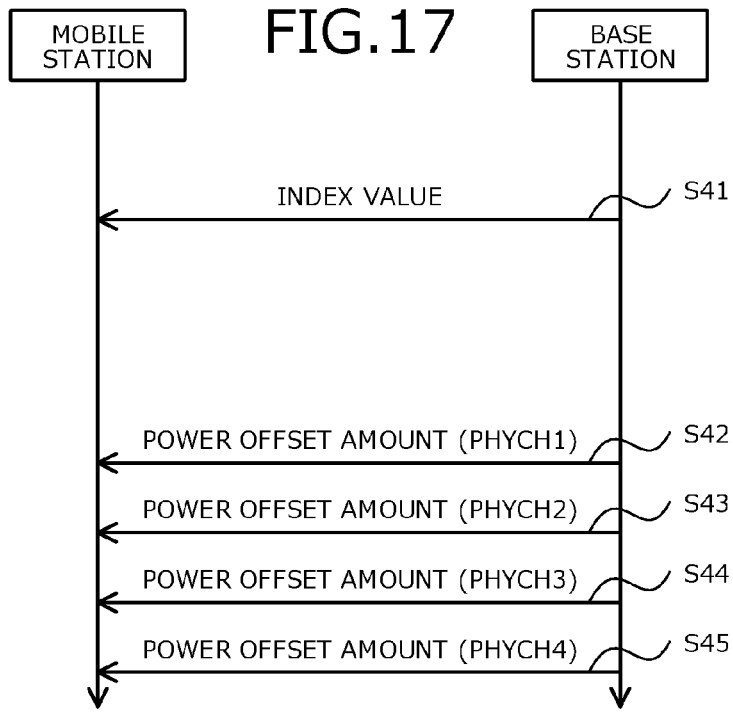
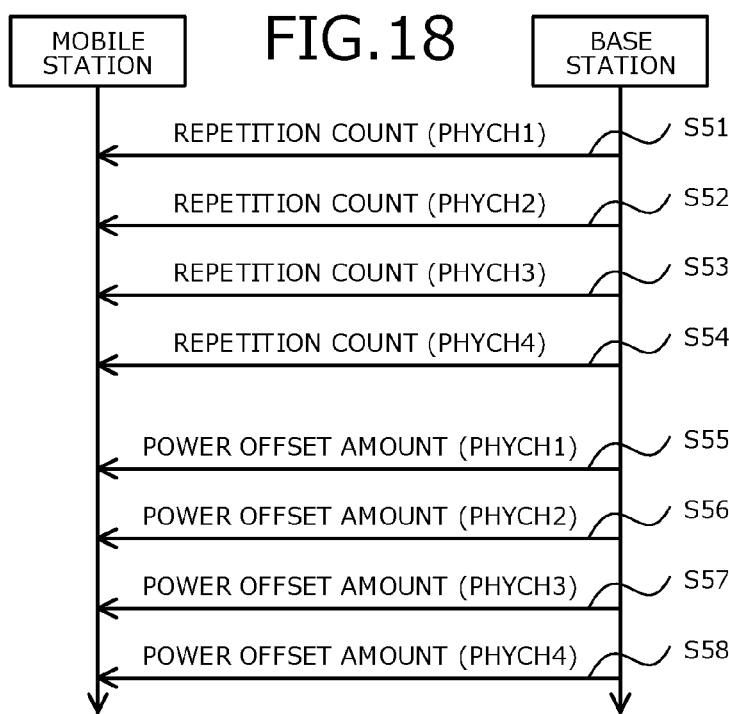

BASE STATION, MOBILE STATION, WIRELESS COMMUNICATIONS SYSTEM, AND WIRELESS COMMUNICATIONS METHOD

CROSS REFERENCE TO RELATED APPLICATIONS

This application is a continuation application of U.S. patent application Ser. No. 15/388,687, filed Dec. 22, 2016 which is a continuation of U.S. patent application Ser. No. 15/066,585, filed in the USPTO on Mar. 10, 2016, now U.S. Pat. No. 9,596,661, issued Mar. 14, 2017, which claims the benefit of International Application PCT/JP2013/076154 filed on Sep. 26, 2013, and designating the U.S., the entire contents of each are incorporated herein by reference.

FIELD

The embodiments discussed herein are related to a base station, a mobile station, a wireless communications system, and a wireless communications method.

BACKGROUND

In a conventional wireless network, control information is transmitted multiple times so as to receive the control information under an environment with a low signal-to-noise ratio (SNR). Additionally, a communications system exists that is called machine-to-machine (M2M) in which machines such as terminals communicate with each other or machine-type communication (MTC) in which a machine and a server on a network communicate with each other (see, for example, Published Japanese-Translation of PCT Application, Publication Nos. 2012-522427, 2013-524563, and 2013-520100).

For example, under an environment with a low signal-to-interference and noise power ratio (SINR), transmission power may be increased (power boost) or transmission may be repeated to expand coverage and maintain a communication link between a base station and a mobile station. If transmission is repeated, the base station notifies the mobile station of information necessary for signal reception such as a transmission repetition count.

However, a required transmission repetition count varies depending on the transmission power of the base station and also varies depending on physical channels, which have differing quality requirements. Therefore, the base station notifies the mobile station of information concerning a power offset amount for increasing the transmission power and information concerning the transmission repetition count for each of the physical channels, resulting in a problem of increased information that is to be notified.

SUMMARY

According to an aspect of an embodiment, a base station includes a transmitting circuit that transmits a first wireless signal to a mobile station by using different physical channels; a receiving circuit that receives a second wireless signal transmitted from the mobile station; an acquiring circuit that acquires reception information indicating a reception state of the first wireless signal at the mobile station, from the second wireless signal received by the receiving circuit; a determining circuit that based on the reception information acquired by the acquiring circuit, determines a repetition count of a third wireless signal repeatedly transmitted from the transmitting circuit; and a lookup table that has an index value associated with repetition counts of the different physical channels. The base station uses the receiving circuit to receive the second wireless signal that includes the reception information from the mobile station. The base station uses the acquiring circuit to acquire the reception information from the second wireless signal that includes the reception information. The base station uses the determining circuit to determine based on the reception information, the repetition count for each physical channel among the different physical channels. The base station acquires from the lookup table, the index value that corresponds to the repetition counts of the different physical channels. The base station uses the transmitting circuit to transmit a fourth wireless signal that includes the index value, to the mobile station and notify the mobile station of the index value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram of an example of a hardware configuration of the base station according to the embodiment;

FIG. 5 is a diagram of an example of a wireless communications method performed by the base station according to the embodiment;

FIG. 6 is diagram of a functional configuration of a first example of a mobile station according to the embodiment;

FIG. 7 is a diagram of a flow of signals or data in the mobile station depicted in FIG. 6;

FIG. 8 is a diagram of an example of a wireless communications method performed by the mobile station according to the embodiment;

FIG. 9 is a diagram of an example of maximum coupling loss between uplink and downlink;

FIG. 10 is a diagram of an example of a relation between repetition count and power boost for a required coverage expansion level;

FIG. 13 is a diagram of an example of a lookup table;

FIG. 16 is a diagram of an example of a wireless connection process sequence in a wireless communications system according to the embodiment;

FIG. 17 is a diagram of an example of a sequence of notification of an index value common to channels; and FIG. 18 is an example of a sequence of notification of respective repetition counts for the channels.

DESCRIPTION OF EMBODIMENTS

Figure 1:
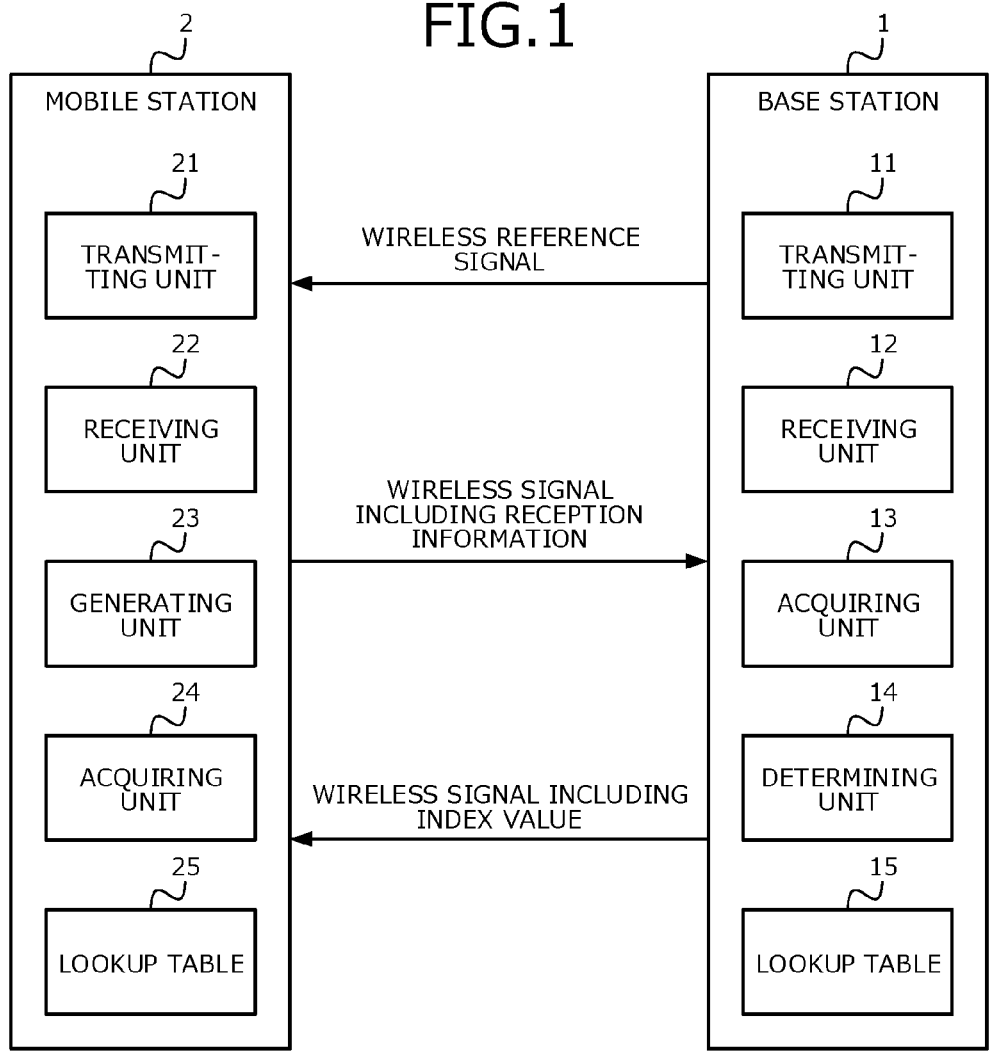
FIG. 1 is a diagram of an example of a wireless communications system according to an embodiment.

Embodiments of a base station, a mobile station, a wireless communications system, and a wireless communications method according to the present invention will be described in detail with reference to the accompanying drawings. In the description of the embodiments hereinafter, identical components are given the same reference numeral and redundant description is omitted herein. Furthermore, the present invention is not limited by the following embodiments.

FIG. 1 is a diagram of an example of a wireless communications system according to an embodiment. As depicted in FIG. 1, the wireless communications system includes a base station 1 and a mobile station 2.

The base station 1 has a transmitting unit 11, a receiving unit 12, an acquiring unit 13, a determining unit 14, and a lookup table 15. The transmitting unit 11 is a base-station transmitting unit; the receiving unit 12 is a base-station receiving unit, the acquiring unit 13 is a base-station acquiring unit; and the lookup table 15 is a base-station lookup table. The units 11 to 14 and the lookup table 15 of the base station 1 will be described in detail in a first example of a base station described later.

The mobile station 2 has a transmitting unit 21, a receiving unit 22, a generating unit 23, an acquiring unit 24, and a lookup table 25. The transmitting unit 21 is a mobile-station transmitting unit; the receiving unit 22 is a mobile-station receiving unit; the acquiring unit 24 is a mobile-station acquiring unit; and the lookup table 25 is a mobile-station lookup table. The units 21 to 24 and the lookup table 25 of the mobile station 2 will be described in detail in a first example of a mobile station described later.

The base station 1 transmits a wireless reference signal to the mobile station 2. The mobile station 2 receives the wireless reference signal, generates reception information indicating a reception state based on the wireless reference signal, and transmits a wireless signal including the reception information to the base station 1. As a result, the base station 1 is notified of the reception information.

The base station 1 receives the wireless signal that includes the reception information, acquires the reception information from the wireless signal, and for each physical channel among multiple different physical channels, determines a repetition count for a repeatedly transmitted wireless signal, based on the reception information. The repetition counts of the different physical channels correlate with each other. Therefore, for each piece of reception information, the repetition counts of the different channels can be associated with one index value.

The base station 1 acquires from the lookup table 15 thereof, an index value that corresponds to the respective repetition counts of the physical channels and transmits a wireless signal including the index value to the mobile station 2. As a result, the mobile station 2 is notified of the index value.

The mobile station 2 receives the wireless signal that includes the index value corresponding to the reception information reported by the mobile station 2 and acquires the index value from the wireless signal. The mobile station 2, from the lookup table 25 thereof, acquires for each physical channel, the repetition count corresponding to the index value. As a result, the mobile station 2 can acquire the repetition counts of the different physical channels.

Figure 2:
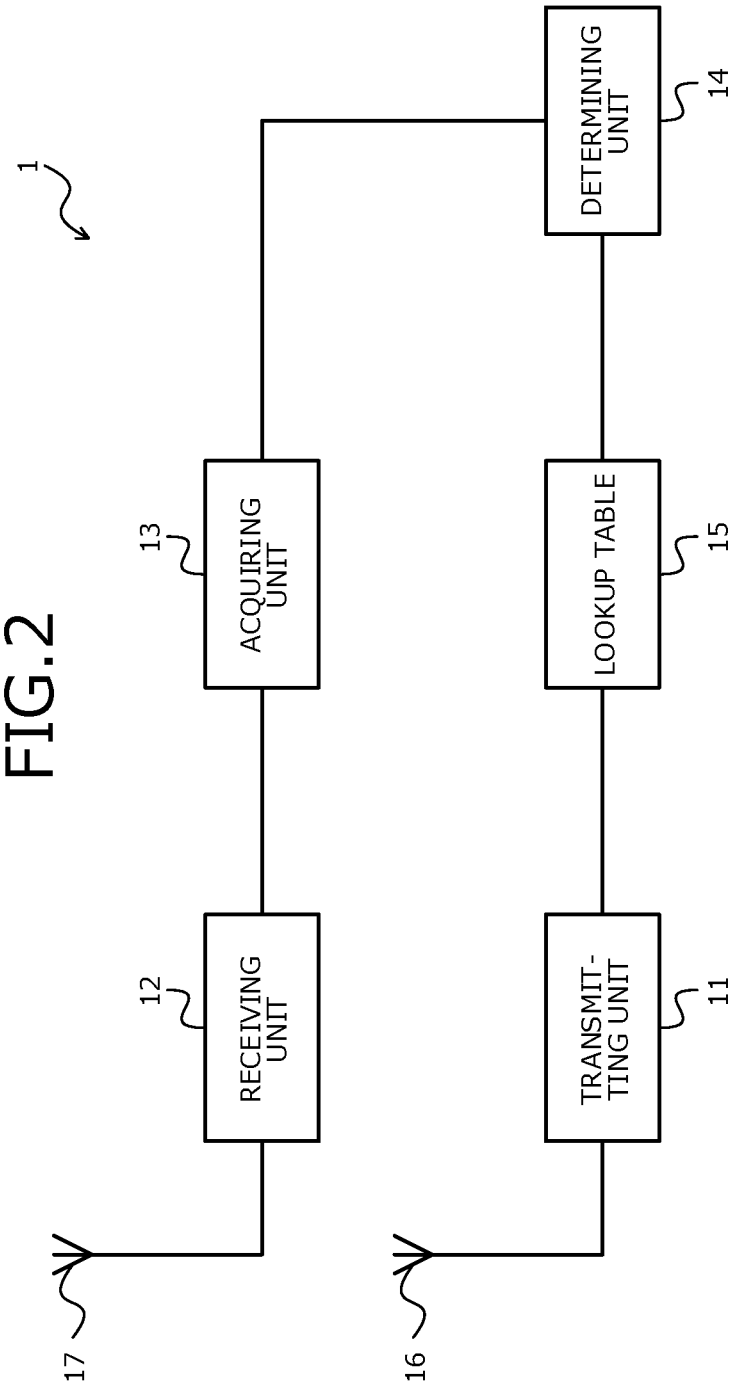
FIG. 2 is a diagram of a functional configuration of a first example of a base station according to the embodiment.
Figure 3:
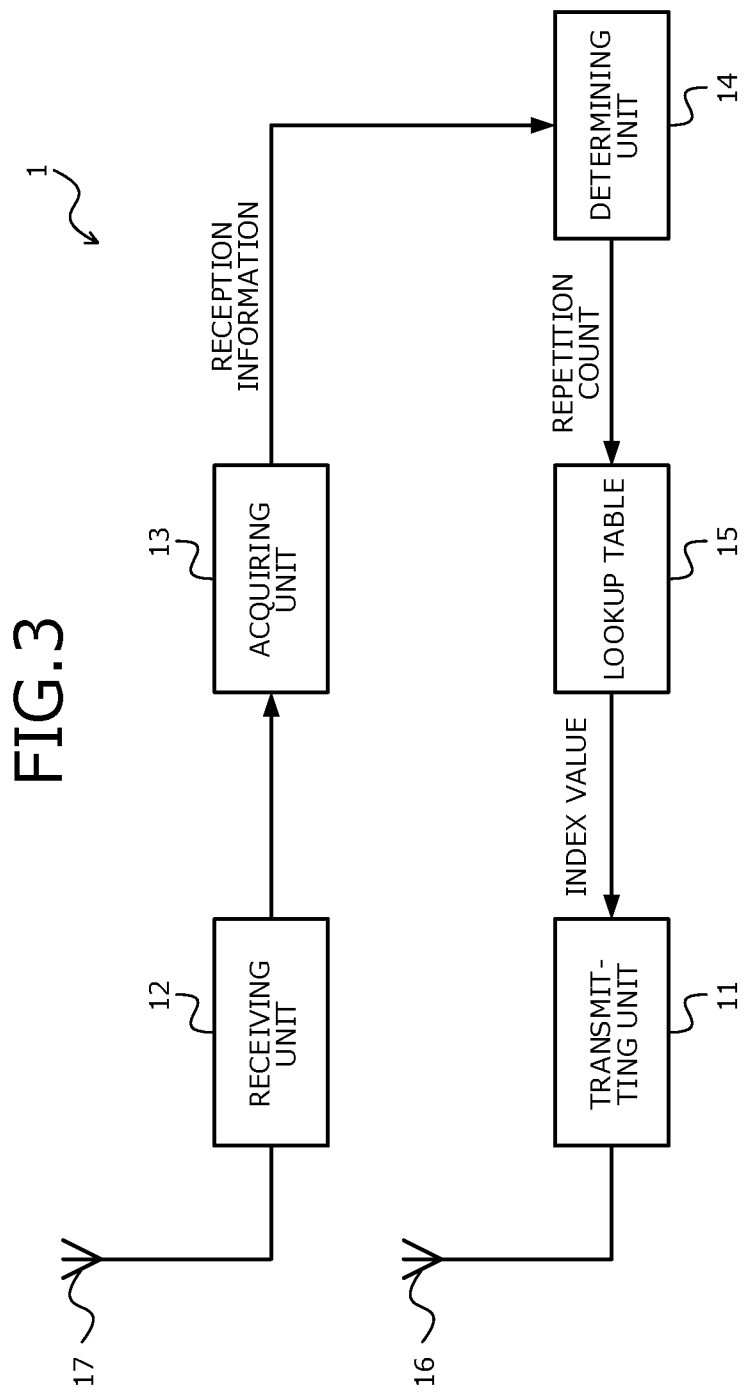
FIG. 3 is a diagram of a flow of signals or data in the base station depicted in FIG. 2.

FIG. 2 is a diagram of a functional configuration of a first example of the base station according to the embodiment. FIG. 3 is a diagram of a flow of signals or data in the base station depicted in FIG. 2. As depicted in FIGS. 2 and 3, the base station 1 has the transmitting unit 11, the receiving unit 12, the acquiring unit 13, the determining unit 14, and the lookup table 15.

The transmitting unit 11 is connected to the lookup table 15 and an antenna 16. The transmitting unit 11 transmits from the antenna 16 to the mobile station 2, wireless signals by using different physical channels. The transmitting unit 11 transmits the wireless reference signal from the antenna 16 to the mobile station 2. The transmitting unit 11 transmits from the antenna 16 to the mobile station 2, a wireless signal that includes an index value acquired from the lookup table 15. As a result, the base station 1 notifies the mobile station 2 of the index value.

The receiving unit 12 is connected to an antenna 17. The receiving unit 12 receives wireless signals transmitted from the mobile station 2 via the antenna 17.

The acquiring unit 13 is connected to the receiving unit 12. The acquiring unit 13 acquires from the wireless signal received by the receiving unit 12, the reception information indicating a reception state of a wireless signal at the mobile station 2. Based on the reception information acquired by the acquiring unit 13, the determining unit 14 determines for the respective physical channels, the repetition counts for wireless signals repeatedly transmitted from the transmitting unit 11.

In the lookup table 15, different index values are respectively associated with the repetition counts of the different physical channels. From the lookup table 15, index values are obtained that correspond to the repetition counts determined by the determining unit 14 for the different physical channels.

FIG. 4 is a diagram of an example of a hardware configuration of the base station according to the embodiment. As depicted in FIG. 4, the base station 1 has a processor 101, memory 102, and an interface 103. The processor 101, the memory 102, and the interface 103 may be connected to a bus 104.

The processor 101 processes a program implementing a wireless communications method performed by a base station described later. The acquiring unit 13 and the determining unit 14 may be implemented in this way at the base station 1 depicted in FIG. 2. Examples of the processor 101 include a central processing unit (CPU), a digital signal processor (DSP), an application specific integrated circuit (ASIC), and a programmable logic device such as a field programmable gate array (FPGA).

The memory 102 retains the lookup table 15. The memory 102 stores a boot program and the program implementing the wireless communications method performed by the base station described later. If the processor 101 is a programmable logic device, the memory 102 may store circuit information of the programmable logic device.

The lookup table 15, various programs, or the circuit information may be stored in a non-volatile area of the memory 102. The non-volatile area of the memory 102 may be implemented by, for example, read only memory (ROM) such as mask ROM, electrically erasable programmable read only memory (EEPROM), and flash memory.

In the memory 102, a volatile area may be used as a work area of the processor 101. The volatile area of the memory 102 may be implemented by, for example, random access memory (RAM) such as dynamic random access memory (DRAM) and static random access memory (SRAM).

The interface 103 manages the input and output of signals and data between the transmitting unit 11 and the receiving unit 12. The interface 103 may manage the input and output of data from and to an application not depicted, for example. The receiving unit 12 and the transmitting unit 11 of the base station 1 depicted in FIG. 2 may be implemented by a processor that processes wireless signals. The processor that processes wireless signals may be provided separately from the processor 101.

The wireless communications method performed by a base station may be performed by the base station depicted in FIG. 2. In the description of this example, the wireless communications method performed by a base station is assumed to be performed by the base station 1 of FIG. 2.

FIG. 5 is a diagram of an example of the wireless communications method performed by the base station according to the embodiment. As depicted in FIG. 5, when the wireless communications method is started at the base station 1, the base station 1 uses the receiving unit 12 to receive from the mobile station 2, a wireless signal that includes reception information (step S1). The base station 1 uses the acquiring unit 13 to acquire the reception information from the wireless signal (step S2).

Subsequently, the base station 1 uses the determining unit 14 to determine for the respective physical channels and based on the reception information, repetition counts for repeated transmission of a wireless signal (step S3). The base station 1 acquires from the lookup table 15, an index value corresponding to the repetition counts for the respective physical channels determined at step S3 (step S4).

Subsequently, the base station 1 uses the transmitting unit 11 to transmit to the mobile station 2, a wireless signal including the index value acquired at step S4 (step S5). As a result, the base station 1 notifies the mobile station 2 of the index value. The base station 1 then terminates a sequence of the wireless communications method. The base station 1 subsequently performs communication through the physical channels with the mobile station 2, at the repetition count for each physical channel corresponding to the index value in the notification to the mobile station 2.

According to the wireless communications system depicted in FIG. 1, the base station 1 depicted in FIG. 2, or the wireless communications method depicted in FIG. 5, the base station 1 notifies the mobile station 2 of the index value corresponding to the repetition counts of the different physical channels. Therefore, as compared to when the base station 1 notifies the mobile station 2 of the repetition counts of the different channels for each physical channel, the amount of information transmitted from the base station 1 to the mobile station 2 is reduced. Thus, the base station 1 can efficiently notify the mobile station 2 of the information necessary for signal reception by the mobile station 2.

FIG. 6 is diagram of a functional configuration of a first example of the mobile station according to the embodiment. FIG. 7 is a diagram of a flow of signals or data in the mobile station depicted in FIG. 6. As depicted in FIGS. 6 and 7, the mobile station 2 has the transmitting unit 21, the receiving unit 22, the generating unit 23, the acquiring unit 24, and the lookup table 25.

The transmitting unit 21 is connected to the generating unit 23 and an antenna 26. The transmitting unit 21 transmits wireless signals from the antenna 26 to the base station 1. The transmitting unit 21 transmits from the antenna 26 to the base station 1, a wireless signal including reception information generated by the generating unit 23. As a result, the mobile station 2 notifies the base station 1 of the reception information indicating the reception state of the mobile station 2.

The receiving unit 22 is connected to an antenna 27. The receiving unit 22 receives via the antenna 27, a wireless signal transmitted from the base station 1 by using the different physical channels. The receiving unit 22 receives a wireless reference signal via the antenna 27 from the base station 1. The receiving unit 22 receives via the antenna 27 from the base station 1, a wireless signal that includes the index value corresponding to the reception information in the notification from the receiving unit 22.

The generating unit 23 is connected to the receiving unit 22. The generating unit 23 generates based on the wireless reference signal received by the receiving unit 22, the reception information indicating the reception state of the mobile station 2. The acquiring unit 24 is connected to the receiving unit 22. The acquiring unit 24 acquires the index value from the wireless signal received by the receiving unit 22.

In the lookup table 25, the repetition counts of the different physical channels are associated with different index values, respectively. From the lookup table 25, the repetition counts corresponding to the index value acquired by the acquiring unit 24 are acquired for each physical channel.

Information of the repetition counts for each physical channel acquired from the lookup table 25 is sent from an output terminal 28 connected to the lookup table 25, to a processing unit that executes a data process based on the information of the repetition counts for each physical channel in the mobile station 2. For example, the information of the repetition counts for each physical channel may be sent from the output terminal 28 to the transmitting unit 21 or from a signal generating unit generating a wireless signal transmitted from the transmitting unit 21.

The hardware configuration of the mobile station 2 is identical to the hardware configuration of the base station 1 depicted in FIG. 4. Therefore, the hardware configuration of the mobile station 2 is not depicted and will not be described. It is noted that in the configuration depicted in FIG. 4, the processor 101 processes a program implementing a wireless communications method performed by a mobile station described later. The generating unit 23 and the acquiring unit 24 may be implemented in this way in the mobile station 2 depicted in FIG. 6.

The lookup table 25 is retained in the memory 102. The interface 103 manages the input and output of signals and data between the transmitting unit 21 and the receiving unit 22. The transmitting unit 21 and the receiving unit 22 of the mobile station 2 depicted in FIG. 6 may be implemented by a processor that processes wireless signals. The processor that processes wireless signals may be provided separately from the processor 101.

The wireless communications method performed by a mobile station may be performed by the mobile station depicted in FIG. 6. In the description of this example, the wireless communications method performed by a mobile station is assumed to be performed by the mobile station 2 depicted in FIG. 6.

FIG. 8 is a diagram of an example of the wireless communications method performed by the mobile station according to the embodiment. As depicted in FIG. 8, when the wireless communications method is started at the mobile station 2, the mobile station 2 uses the receiving unit 22 to receive a wireless reference signal from the base station 1

(step S11). The base station 1 transmits the wireless reference signal before step S1 in the wireless communications method depicted in FIG. 5.

Subsequently, the mobile station 2 uses the generating unit 23 to generate reception information indicating the reception state of the mobile station 2, based on the received wireless reference signal (step S12). The mobile station 2 then uses the transmitting unit 21 to transmit the wireless signal including the reception information generated at step S12 to the base station 1 (step S13). As a result, the mobile station 2 notifies the base station 1 of the reception state of the mobile station 2.

Subsequently, the mobile station 2 uses the receiving unit 22 to receive from the base station 1, a wireless signal that includes the index value corresponding to the reception information transmitted at step S13 (step S14). The mobile station 2 uses the acquiring unit 24 to acquire the index value from the wireless signal (step S15).

Subsequently, for each physical channel, the mobile station 2 acquires from the lookup table 25, repetition counts that correspond to the index value acquired at step S15 (step S16). The mobile station 2 then terminates a sequence of the wireless communications method. The mobile station 2 subsequently performs communication through the channels with base station 1 by using the repetition counts of the respective physical channels, corresponding to the index value in the notification from the base station 1.

According to the mobile station 2 depicted in FIG. 6 or the wireless communications method depicted in FIG. 8, the mobile station 2 notified of an index value by the base station 1 can acquire from the lookup table 25 and for each physical channel, the repetition counts that correspond to the index value. This means that the base station 1 suffices to notify the mobile station 2 of an index value instead of giving notification of the repetition counts for each channel among the different channels. Therefore, as compared to when the base station 1 notifies the mobile station 2 of a repetition count for each channel, the amount of information transmitted from the base station 1 to the mobile station 2 is reduced. Thus, the base station 1 can efficiently notify the mobile station 2 of the information necessary for signal reception by the mobile station 2.

An example of application to an MTC System will be described. Under an environment with a low SINR, for example, when a mobile station is present in the vicinity of a boundary with an adjacent cell, the SINR may become lower than the value required for communication between a base station and the mobile station. In such a case, as described above, for example, transmission power may be increased (power boost) or transmission may be repeated to expand coverage.

FIG. 9 is a diagram of an example of maximum coupling loss between uplink and downlink. A table depicted in FIG. 9 is introduced in 3GPP TR 36.888 V2.0.2, "Study on provision of low-cost MTC UEs based on LTE." In this table, MCL (Maximum Coupling Loss) stands for a maximum coupling loss. FDD (Frequency Division Duplex) stands for a frequency division duplex mode. TDD (Time Division Duplex) stands for a time division duplex mode.

In the table depicted in FIG. 9, a UE (User Equipment, mobile station) has one transmission antenna and two reception antennas. Therefore, MCL (FDD, 2×2 eNB) represents a maximum coupling loss when communication is performed in the frequency division duplex mode between an eNB (evolutional Node B, base station) having two transmission antennas and two reception antennas and a UE having one transmission antenna and two reception antennas. MCL (TDD, 8×8 eNB) represents a maximum coupling loss when communication is performed in the time division duplex mode between an eNB having eight transmission antennas and eight reception antennas and a UE having one transmission antenna and two reception antennas.

As depicted in FIG. 9, the maximum coupling loss is different for each of the physical channels. For example, in the example depicted in FIG. 9, the maximum coupling loss in the case of the frequency division duplex mode is 147.2 dB in PUCCH(1a), 141.7 dB in PRACH, and 140.7 dB in PUSCH. The maximum coupling loss in the case of the frequency division duplex mode is 145.4 dB in PDSCH, 149.0 dB in PBCH, 149.3 dB in SCH, and 146.1 dB in PDCCH(1A).

As depicted in FIG. 9, the maximum coupling loss differs depending on the mode of duplex operation. For example, in the example depicted in FIG. 9, the maximum coupling loss in the case of the time division duplex mode is 149.4 dB in PUCCH(1a), 146.7 dB in PRACH, and 147.4 dB in PUSCH. The maximum coupling loss in the case of the time division duplex mode is 148.1 dB in PDSCH, 149.0 dB in PBCH, 149.3 dB in SCH, and 146.9 dB in PDCCH(1A). The maximum coupling loss MCL is calculated by expression (1), for example.

$$MCL = [\text{actual transmission power}] - ([\text{effective noise power}] + [\text{required value of SINR}])$$

The PUCCH is a physical uplink control channel. The PRACH is a physical random access channel. The PUSCH is a physical uplink shared channel. The PDSCH is a physical downlink shared channel. The PBCH is a physical broadcast channel. The SCH is a synchronization channel. The PDCCH is a physical downlink control channel.

When the current SINR value is smaller than the minimum SINR value required for communication through a physical channel, a coverage expansion level is required that reduces the difference therebetween to zero. By suitably selecting a level of increase in transmission power and a transmission repetition count, a required coverage expansion level can be satisfied. If a UE is in a coverage hole, the required coverage expansion level is approximately 0 to 20 dB, for example.

The minimum SINR required for communication through each of the physical channels differs with consideration of different reception probabilities according to the purposes of the physical channels.

The coverage expansion level required for each of the physical channels is defined as a difference between the current SINR value and the minimum SINR value required for communication through the physical channel and is therefore different for each of the physical channels. The difference between the current SINR value and the minimum SINR value required for communication through a physical channel can be eliminated by increasing the transmission power and/or increasing the transmission repetition count for the physical channel. Therefore, the transmission repetition count for a physical channel varies depending on the transmission power for the physical channel. Thus, if a level of increase in transmission power for each physical channel is determined, the transmission repetition count satisfying the coverage expansion level required for the physical channel is determined for each physical channel. It is noted that the values of the maximum coupling loss are not limited to those depicted in FIG. 9.

FIG. 10 is a diagram of an example of a relation between the repetition count and the power boost for the required coverage expansion level. In the example depicted in FIG.

10, for example, a physical channel PHYCH1 has a required coverage expansion level of 10 dB and a gain of 10 dB may be achieved by repeating transmission 10 times. For example, a physical channel PHYCH2 has a required coverage expansion level of 10 dB identical to the PHYCH1 and a gain of 6 dB may be acquired by repeating transmission four times while a gain of 4 dB is achieved by power boost.

For example, a physical channel PHYCH3 has a required coverage expansion level of 12 dB and a gain of 6 dB may be acquired by repeating transmission four times while a gain of 6 dB is achieved by power boost. It is noted that the values of the required coverage expansion level, the transmission repetition count, and the power boost are not limited to those depicted in FIG. 10.

The PHYCH1, the PHYCH2, and the PHYCH3 may be, for example, a PDSCH, a PDCCH, a PHICH, or an EPDCCH. The PHICH is a physical hybrid-ARQ indicator channel. The EPDCCH is an enhanced physical downlink control channel.

Figure 11:
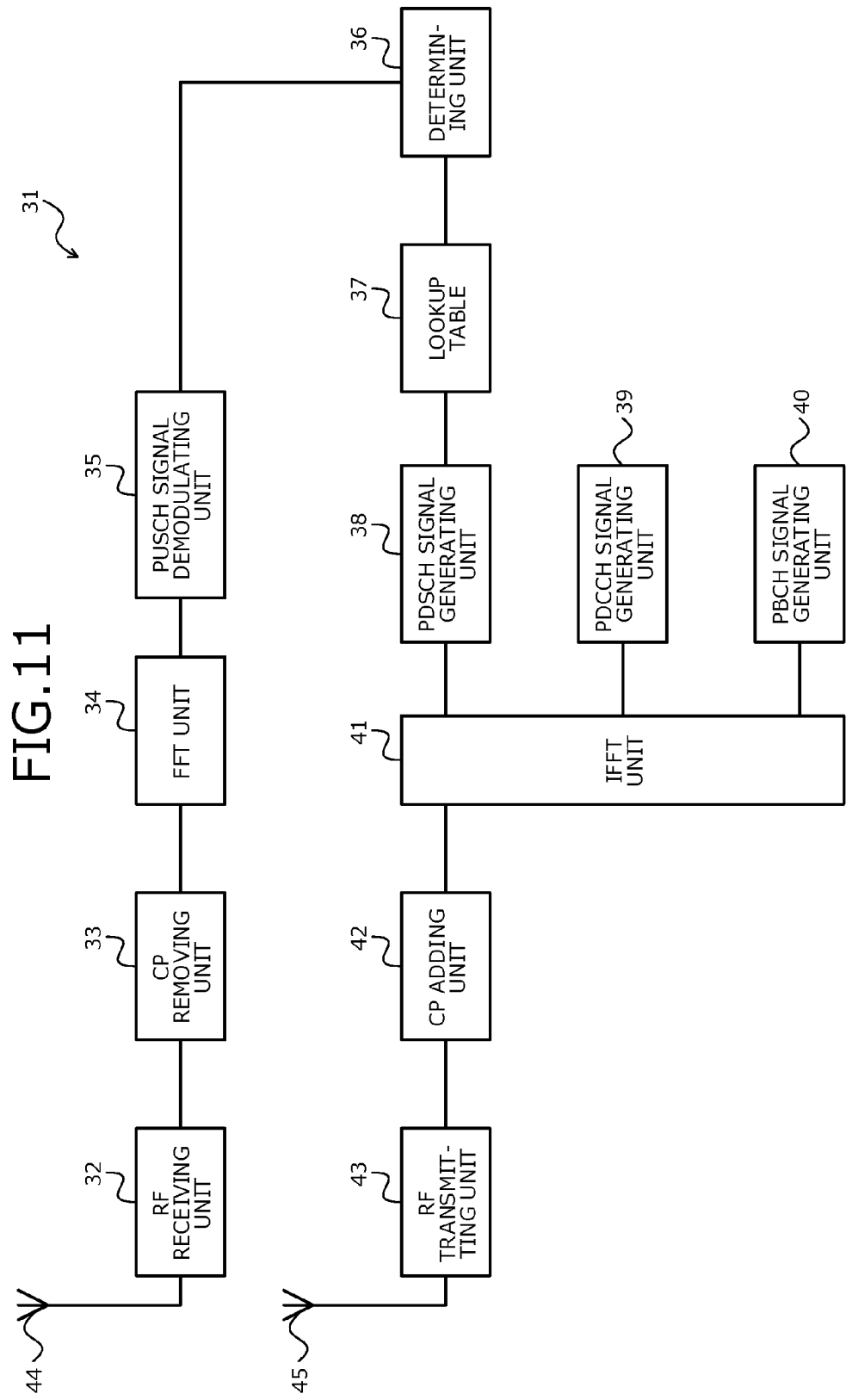
FIG. 11 is a diagram of a functional configuration of a second example of the base station according to the embodiment.
Figure 12:
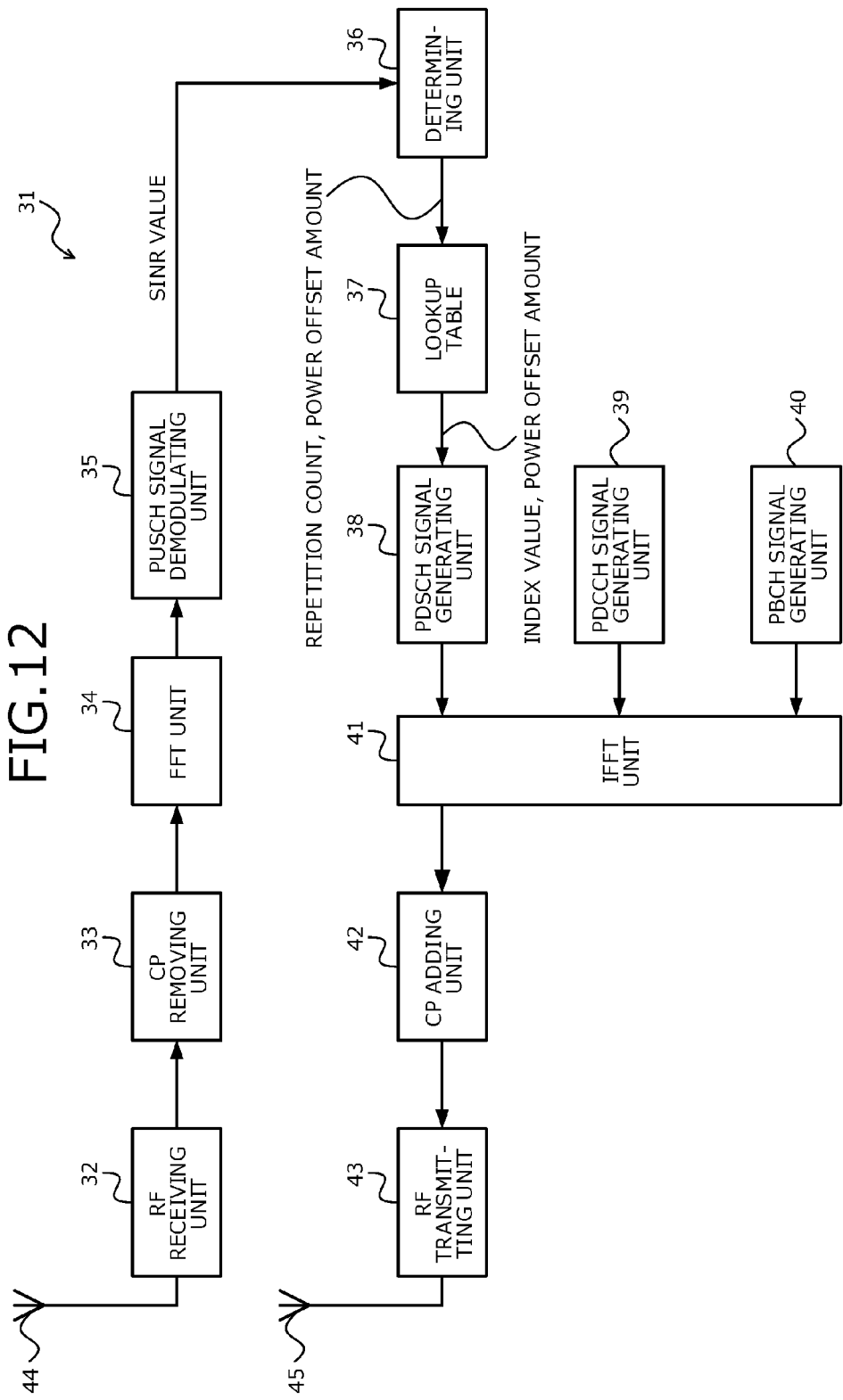
FIG. 12 is a diagram of a flow of signals or data in the base station depicted in FIG. 11.

FIG. 11 is a diagram of a functional configuration of a second example of the base station according to the embodiment. FIG. 12 is a diagram of a flow of signals or data in the base station depicted in FIG. 11. In this example, description will be taking as an example, a case where coverage is expanded for two physical channels, a PDCCH and a PDSCH, in an MTC system.

As depicted in FIGS. 11 and 12, a base station 31 has a radio frequency (RF) receiving unit 32, a cyclic prefix (CP) removing unit 33, and a fast Fourier transform (FFT) unit 34. The base station 31 has a PUSCH signal demodulating unit 35, a determining unit 36, and a lookup table 37. The base station 31 has a PDSCH signal generating unit 38, a PDCCH signal generating unit 39, a PBCH signal generating unit 40, an inverse fast Fourier transform (IFFT) unit 41, a CP adding unit 42, and an RF transmitting unit 43.

The RF receiving unit 32 is connected to an antenna 44. The RF receiving unit 32 receives via the antenna 44, a wireless signal transmitted from a mobile station. The RF receiving unit 32 is an example of a receiving unit.

The CP removing unit 33 is connected to the RF receiving unit 32. The CP removing unit 33 removes a cyclic prefix from the wireless signal received by the RF receiving unit 32. The FFT unit 34 performs fast Fourier transform for the signal from which the cyclic prefix is removed by the CP removing unit 33. As a result, a time-domain signal is converted into a frequency-domain signal.

The PUSCH signal demodulating unit 35 demodulates a PUSCH signal converted into a frequency-domain signal by the FFT unit 34. The PUSCH signal demodulating unit 35 demodulates the PUSCH signal and thereby, acquires an SINR value in a notification through the PUSCH signal from the mobile station. The SINR value is an example of reception information indicating the reception state of a mobile station. The PUSCH signal demodulating unit 35 is an example of an acquiring unit.

The determining unit 36 determines transmission repetition counts and power offset amounts for increasing the transmission power for the PDCCH and the PDSCH, based on the SINR value acquired by the PUSCH signal demodulating unit 35. The determining unit 36 can determine the repetition counts and the power offset amounts for the physical channels with a known technique based on the SINR value reported from the mobile station.

From the lookup table 37, an index value is acquired based on the respective repetition counts and power offset amounts for the PDCCH and the PDSCH determined by the determining unit 36. The index value is common to the PDCCH and the PDSCH. The power offset amount is set for the PDCCH and the PDSCH, respectively.

The PDSCH signal generating unit 38 generates a PDSCH signal. The PDSCH signal generating unit 38 generates the PDSCH signal including the index value and the power offset amounts for the PDCCH and the PDSCH. The PDCCH signal generating unit 39 generates a PDCCH signal. The PBCH signal generating unit 40 generates a PBCH signal.

The IFFT unit 41 performs inverse fast Fourier transform for the PDSCH signal generated by the PDSCH signal generating unit 38, the PDCCH signal generated by the PDCCH signal generating unit 39, or the PBCH signal generated by the PBCH signal generating unit 40. As a result, a frequency-domain signal is converted into a time-domain signal.

The CP adding unit 42 adds a cyclic prefix to the time-domain signal converted by the IFFT unit 41. The RF transmitting unit 43 is connected to the CP adding unit 42 and an antenna 45. The RF transmitting unit 43 transmits the wireless signal having the cyclic prefix added by the CP adding unit 42, from the antenna 45 to the mobile station. The RF transmitting unit 43 is an example of a transmitting unit.

FIG. 13 is a diagram of an example of a lookup table. As depicted in FIG. 13, the lookup table 37 has 16 records corresponding to 16 index values of 0, 1, 2, . . . , 15, for example. For each record, an SINR value corresponding to the SINR value in the notification from the mobile station is set along with respective repetition count reference values and repetition count correction values for the PDSCH and the PDCCH.

In the lookup table 37, the SINR value corresponding to the SINR value in the notification from the mobile station is preset at the installation stage of the base station 31. The SINR value corresponding to the SINR value in the notification from the mobile station is acquired from simulation, for example.

The repetition count reference value is the repetition count when the power offset amount is 0 dB. In the lookup table 37, the repetition count reference values are preset at the installation stage of the base station 31. The repetition count reference values are acquired from simulation, for example. From the repetition count reference values, a record to be used in FIG. 13 is determined and an index value corresponding thereto can be acquired.

The repetition count correction value is a value for correcting the repetition count reference value according to the power offset amount. The repetition count correction value is acquired by, for example, multiplying the repetition count reference value by a correction coefficient derived from the power offset amount.

For example, in the example depicted in FIG. 13, when the index value is denoted by k, a record of an index value k has $SINR_k$ set as the SINR value corresponding to the SINR value reported by the mobile station. It is noted that k is an integer from 0 to 15. The record of the index value k has $RL_{PDSCH,k}$ as the repetition count reference value for the PDSCH and $RL_{PDCCH,k}$ as the repetition count reference value for the PDCCH.

The record of the index value k has a calculation expression expressed by, for example, expression (2) set as the repetition count correction value for the PDSCH. The record has a calculation expression expressed by, for example, expression (3) as the repetition count correction value for the PDCCH. It is noted that $a_{PDSCH}$ and $a_{PDCCH}$ are correction coefficients for the PDSCH and the PDCCH, respectively.

$$RL_{PDSCH,k} \times a_{PDSCH} \quad (2)$$

$$RL_{PDCCH,k} \times a_{PDCCH} \quad (3)$$

When the power offset amount for the PDSCH is denoted by $PO_{PDSCH}$, the correction coefficient $a_{PDSCH}$ for the PDSCH is expressed by expression (4), for example. When the power offset amount for the PDCCH is denoted by $PO_{PDCCH}$, the correction coefficient $a_{PDCCH}$ for the PDCCH is expressed by expression (5), for example.

$$a_{PDSCH} = 10^{\frac{-PO_{PDSCH}}{10}} \quad (4)$$

$$a_{PDCCH} = 10^{\frac{-PO_{PDCCH}}{10}} \quad (5)$$

$PO_{PDSCH}$ may take on values of 0 dB, 2 dB, 4 dB, and 6 dB, for example. $PO_{PDCCH}$ may take on values of 0 dB, 2 dB, 4 dB, and 6 dB, for example. The values that $PO_{PDSCH}$ may take and the values that $PO_{PDCCH}$ may take may differ.

For example, once the repetition counts and the power offset amounts for the physical channels are determined by the determining unit 36, repetition count correction values can be obtained for the physical channels from the lookup table 37 depicted in FIG. 13 by using the respective power offset amounts and repetition reference values.

The hardware configuration of the base station 31 is the same as the hardware configuration of the base station 1 depicted in FIG. 4. Therefore, the hardware configuration of the base station 31 is not depicted and redundant description is omitted. It is noted that in the configuration depicted in FIG. 4, the processor 101 processes the program that implements the wireless communications method performed by the base station 31. The units 33 to 36, 38 to 42 excluding the RF receiving unit 32 and the RF transmitting unit 43 may be implemented in this way at the base station 31 depicted in FIG. 11.

The lookup table 37 is retained in the memory 102. The interface 103 manages the input and output of signals and data between the RF transmitting unit 43 and the RF receiving unit 32. The RF transmitting unit 43 and the RF receiving unit 32 of the base station 31 depicted in FIG. 11 may be implemented by a processor that processes wireless signals. The processor that processes wireless signals may be provided separately from the processor 101.

The wireless communications method performed by the base station 31 is identical to the method depicted in FIG. 5, for example. Therefore, redundant description of the method is omitted. It is noted that in the method depicted in FIG. 5, the reception information is the SINR value. At step S3, the base station 31 uses the determining unit 36 to determine the repetition counts and the power offset amounts. At step S5, the base station 31 uses the RF transmitting unit 43 to transmit the wireless signal including the index value and the power offset amounts to the mobile station.

According to the base station 31 depicted in FIG. 11, the base station 31 notifies the mobile station of an index value common to the repetition counts of the different physical channels. Therefore, as compared to when the base station 31 notifies the mobile station of the repetition counts for each physical channel among the different channels, the amount of information sent from the base station 31 to the mobile station is reduced. Thus, the base station 31 can efficiently notify the mobile station of the information necessary for signal reception by the mobile station.

According to the base station 31 depicted in FIG. 11, the base station 31 notifies the mobile station of the power offset amount for each channel. This enables the mobile station to obtain the repetition counts of the respective physical channels, based on the index value common to the different physical channels and the power offset amount for each physical channel.

According to the base station 31 depicted in FIG. 11, the repetition count can be corrected according to the power offset amount based on a calculation expression set in the lookup table 37. Additionally, the index value can be easily acquired by finding the index value for which the repetition count correction values obtained by using the lookup table 37 matches the repetition counts determined based on the SINR value in the notification from the mobile station. Moreover, in the lookup table 37, since the SINR value and the repetition count reference value are acquired by, for example, simulation, the lookup table 37 can be easily created.

Figure 14:
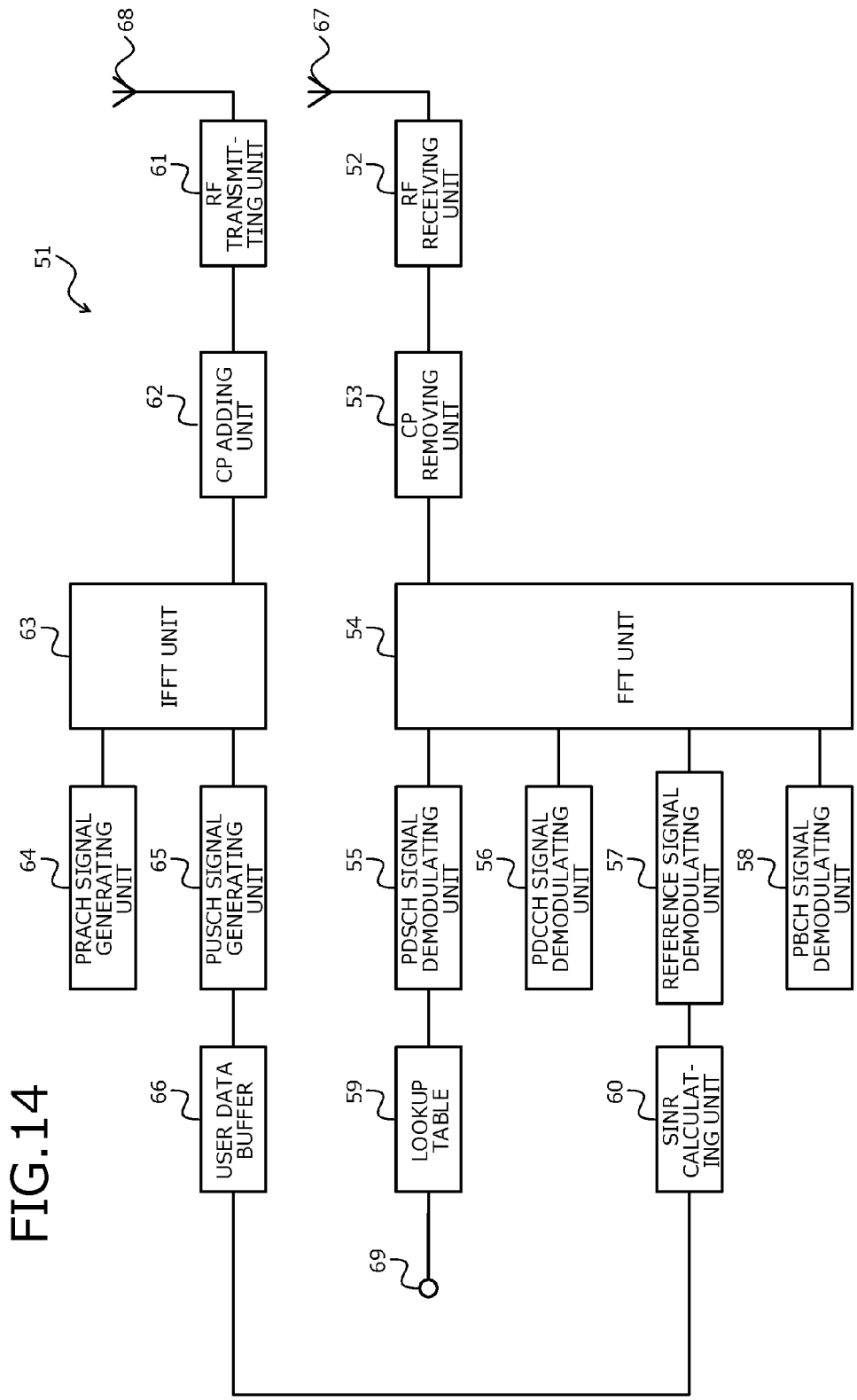
FIG. 14 is a diagram of a functional configuration of a second example of the mobile station according to the embodiment.
Figure 15:
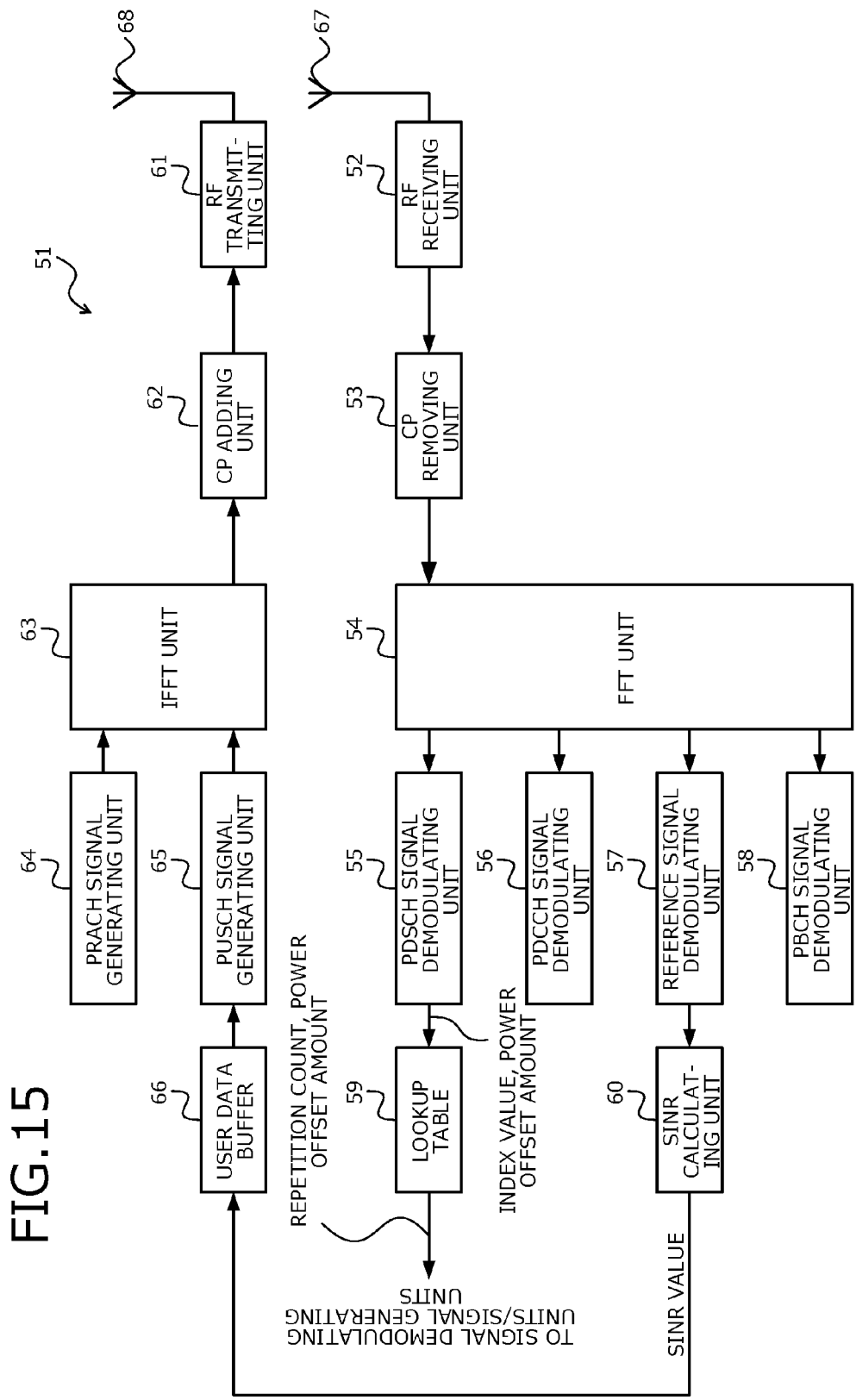
FIG. 15 is a diagram of a flow of signals or data in the base station depicted in FIG. 14.

FIG. 14 is a diagram of a functional configuration of a second example of the mobile station according to the embodiment. FIG. 15 is a diagram of a flow of signals or data in the base station depicted in FIG. 14. In this example, description will be taken as an example, a case where coverage is expanded for two physical channels, a PDCCH and a PDSCH, in an MTC system.

As depicted in FIGS. 14 and 15, the mobile station 51 has an RF receiving unit 52, a CP removing unit 53, and an FFT unit 54. The mobile station 51 has a PDSCH signal demodulating unit 55, a PDCCH signal demodulating unit 56, a reference signal demodulating unit 57, a PBCH signal demodulating unit 58, a lookup table 59, and a SINR calculating unit 60. The mobile station 51 has an RF transmitting unit 61, a CP adding unit 62, an IFFT unit 63, a PRACH signal generating unit 64, a PUSCH signal generating unit 65, and a user data buffer 66.

The RF receiving unit 52 is connected to an antenna 67. The RF receiving unit 52 receives via the antenna 67, a wireless signal transmitted from a base station. The RF receiving unit 52 is an example of a receiving unit.

The CP removing unit 53 is connected to the RF receiving unit 52. The CP removing unit 53 removes a cyclic prefix from the wireless signal received by the RF receiving unit 52. The FFT unit 54 performs fast Fourier transform for the signal from which the cyclic prefix is removed by the CP removing unit 53. As a result, a time-domain signal is converted into a frequency-domain signal.

The PDSCH signal demodulating unit 55 demodulates a PDSCH signal converted into a frequency-domain signal by the FFT unit 54. The PDSCH signal demodulating unit 55 demodulates the PUSCH signal and thereby, acquires an index value and a power offset amount in a notification through a PDSCH signal from the base station. The PDSCH signal demodulating unit 55 is an example of an acquiring unit.

The PDCCH signal demodulating unit 56 demodulates a PDCCH signal converted into a frequency-domain signal by the FFT unit 54. The reference signal demodulating unit 57 demodulates a reference signal converted into a frequency-domain signal by the FFT unit 54. The PBCH signal demodulating unit 58 demodulates a PBCH signal converted into a frequency-domain signal by the FFT unit 54.

From the lookup table 59, the repetition count for the PDSCH corresponding to the power offset amount for the PDSCH is acquired based on the index value and the power offset amount for the PDSCH acquired by the PDSCH signal demodulating unit 55. Additionally, from the lookup table 59, the repetition count for the PDSCH corresponding to the power offset amount for the PDSCH is acquired based on the index value and the power offset amount for the PDSCH acquired by the PDSCH signal demodulating unit 55. The lookup table 59 may be the same table as the lookup table 37 depicted in FIG. 13.

The information of the repetition counts of the respective physical channels acquired from the lookup table 59 and the respective power offset amounts of the physical channels is sent from an output terminal 69 connected to the lookup table 59, to a processing unit that executes a data process based on this information at the mobile station 51.

For example, the information of the repetition count and the power offset amount for the PDSCH is sent to the PDSCH signal demodulating unit 55. The PDSCH signal demodulating unit 55 demodulates the PDSCH signal based on the information of the repetition count and the power offset amount for the PDSCH. The information of the repetition count and the power offset amount for the PDCCH is sent to the PDCCH signal demodulating unit 56. The PDCCH signal demodulating unit 56 demodulates the PDCCH signal based on the information of the repetition count and the power offset amount for the PDCCH.

As is the case with the PDSCH and the PDCCH, the information of the respective repetition counts and power offset amounts is acquired for the PRACH and the PUSCH. For example, the information of the repetition count and the power offset amount for the PRACH is sent to the PRACH signal generating unit 64. The PRACH signal generating unit 64 generates the PRACH signal based on the information of the repetition count and the power offset amount for the PRACH. The information of the repetition count and the power offset amount for the PUSCH is sent to the PUSCH signal generating unit 65. The PUSCH signal generating unit 65 generates the PUSCH signal based on the information of the repetition count and the power offset amount for the PUSCH.

The SINR calculating unit 60 calculates an SINR value based on the reception intensity of the reference signal demodulated by the reference signal demodulating unit 57. The SINR calculating unit 60 can calculate the SINR value by a known technique based on the reception intensity of the reference signal. The SINR value is an example of the reception information indicating the reception state of the mobile station 51. The SINR calculating unit 60 is an example of a generating unit.

The user data buffer 66 temporarily retains the SINR value acquired by the SINR calculating unit 60. The PUSCH signal generating unit 65 generates a PUSCH signal including the SINR value stored in the user data buffer 66. The PRACH signal generating unit 64 generates a PRACH signal.

The IFFT unit 63 performs inverse fast Fourier transform for the PRACH signal generated by the PRACH signal generating unit 64 or the PUSCH signal generated by the PUSCH signal generating unit 65. As a result, a frequency-domain signal is converted into a time-domain signal.

The CP adding unit 62 adds a cyclic prefix to the time-domain signal converted by the IFFT unit 63. The RF transmitting unit 61 is connected to the CP adding unit 62 and an antenna 68. The RF transmitting unit 61 transmits from the antenna 68 to the base station, the wireless signal having the cyclic prefix added by the CP adding unit 62. The RF transmitting unit 61 is an example of a transmitting unit.

The hardware configuration of the mobile station 51 is identical to the hardware configuration of the base station 1 depicted in FIG. 4. Therefore, the hardware configuration of the mobile station 51 is not depicted and redundant description is omitted. It is noted that in the configuration depicted in FIG. 4, the processor 101 processes the program implementing the wireless communications method performed by the mobile station 51. The units 53 to 58, 60, 62 to 65 except the RF receiving unit 52 and the RF transmitting unit 61 may be implemented in this way in the mobile station 51 depicted in FIG. 14.

The lookup table 59 is retained in the memory 102. The user data buffer 66 may be implemented by the memory 102. The interface 103 manages input and output of signals and data between the RF transmitting unit 61 and the RF receiving unit 52. The RF transmitting unit 61 and the RF receiving unit 52 of the mobile station 51 depicted in FIG. 14 may be implemented by a processor processing a wireless signal. The processor processing a wireless signal may be provided separately from the processor 101.

The wireless communications method performed by the mobile station 51 is identical to the method depicted in FIG. 8, for example. Therefore, redundant description of the method is omitted. It is noted that in the method depicted in FIG. 8, the wireless reference signal is the reference signal and that the reception information is the SINR value. At step S14, the mobile station 51 receives the wireless signal including the index value and the power offset amounts of the respective channels.

According to the mobile station 51 depicted in FIG. 14, when notified of the index value from the base station, the mobile station 51 can acquire for the respective physical channels from the lookup table 59, the repetition counts corresponding to the index value. This means that the base station can notify the mobile station 51 of the index value instead of giving notification of the repetition counts for each physical channel among the different physical channels. Therefore, as compared to when the base station notifies the mobile station 51 of repetition counts for each physical channel, the amount of information sent from the base station to the mobile station 51 is reduced. As a result, the base station can efficiently notify the mobile station 51 of the information necessary for signal reception by the mobile station 51.

According to the mobile station 51 depicted in FIG. 14, the base station notifies the mobile station 51 of the respective power offset amounts for the physical channels. This enables the mobile station 51 to obtain the respective repetition counts of the physical channels based on the index value common to the different physical channels and the respective power offset amounts of the physical channels.

According to the mobile station 51 depicted in FIG. 14, the repetition count can be corrected according to the power offset amount, based on a calculation expression set in the lookup table 59 for each index value. Additionally, since the repetition count reference value in the lookup table 59 is acquired by, for example, simulation, the lookup table 59 can be easily created.

FIG. 16 is a diagram of an example of a wireless connection process sequence in a wireless communications system according to the embodiment. As depicted in FIG. 16, it is assumed that the wireless communications system includes a base station, a mobile station A, and a mobile station B. The mobile station A and the mobile station B may have required coverage expansion levels different from each other. For example, the coverage expansion level required for the mobile station A may be 15 dB and the coverage expansion level required for the mobile station B may be 20 dB.

When the wireless connection process is started, first, the base station transmits synchronization signals to the mobile station A and the mobile station B (step S21). Subsequently, the base station uses the PBCH signals to transmit system information, SIB (system information block), to the mobile station A and the mobile station B. At this point in time, the base station does not know the coverage expansion levels required for the mobile station A or the mobile station B and therefore, transmits the PBCH signals at the maximum repetition count (step S22).

Subsequently, the mobile station A and the mobile station B transmit the PRACH signals to the base station at the maximum repetition count (step S23). Subsequently, the base station transmits cell-specific reference signals (CRSs) to the mobile station A and the mobile station B (step S24). The mobile station A and the mobile station B receive the reference signals and then calculate the SINR values to roughly determine the coverage expansion levels (step S25). The base station transmits the PDCCH signals to the mobile station A and the mobile station B at the maximum repetition count (step S26).

Subsequently, the mobile station A and the mobile station B transmit the PUSCH signals including the SINR values to the base station at the maximum repetition count to feed back the SINR values to the base station (step S27). The base station receives the PUSCH signals including the SINR values and then determines the repetition counts and the power offset amounts for channels, for example, the PDCCH and the PDSCH, based on the SINR values (step S28).

Subsequently, the base station acquires from the lookup table, an index value common to the channels and power offset values for the respective channels. The base station transmits the PDSCH signals including the index value to the mobile station A and the mobile station B to notify the mobile station A and the mobile station B of the index value (step S29). The base station transmits the PDSCH signals including the power offset amounts of the respective channels to the mobile station A and the mobile station B to notify the mobile station A and the mobile station B of the respective power offset amounts of the channels (step S30).

The mobile station A and the mobile station B acquire the respective repetition counts of the channels from the lookup tables, based on the index value and the power offset amounts. Subsequently, communication links are maintained between the base station and the mobile stations A, B based on the repetition counts of the respective channels and the power offset amounts of the respective channels.

A reduction in the amount of information sent from the base station to the mobile station will be described. FIG. 17 is a diagram of an example of a sequence of notification of an index value common to channels. FIG. 18 is an example of a sequence of notification of respective repetition counts for the channels. In the examples depicted in FIG. 17 and FIG. 18, it is assumed that physical channels PHYCH1, PHYCH2, PHYCH3, and PHYCH4 exist.

As depicted in FIG. 17, in the case of notification of an index value common to the channels, a base station transmits a PDSCH signal including the index value to a mobile station (step S41). The base station transmits a PDSCH signal including a power offset amount for the PHYCH1 to the mobile station (step S42). The base station transmits a PDSCH signal including a power offset amount for the PHYCH2 to the mobile station (step S43). The base station transmits a PDSCH signal including a power offset amount for the PHYCH3 to the mobile station (step S44). The base station transmits a PDSCH signal including a power offset amount for the PHYCH4 to the mobile station (step S45).

On the other hand, as depicted in FIG. 18, in the case of notification of the respective repetition counts for the channels, the base station transmits a PDSCH signal including the repetition count for the PHYCH1 to the mobile station (step S51). The base station transmits a PDSCH signal including the repetition count for the PHYCH2 to the mobile station (step S52). The base station transmits a PDSCH signal including the repetition count for the PHYCH3 to the mobile station (step S53). The base station transmits a PDSCH signal including the repetition count for the PHYCH4 to the mobile station (step S54).

Additionally, the base station transmits a PDSCH signal including a power offset amount for the PHYCH1 to the mobile station (step S55). The base station transmits a PDSCH signal including a power offset amount for the PHYCH2 to the mobile station (step S56). The base station transmits a PDSCH signal including a power offset amount for the PHYCH3 to the mobile station (step S57). The base station transmits a PDSCH signal including a power offset amount for the PHYCH4 to the mobile station (step S58).

In the examples depicted in FIG. 17 and FIG. 18, for example, the power offset amount is assumed to be any of four values of 0 dB, 2 dB, 4 dB, 6 dB and the repetition count is assumed to be any of 1, 2, . . . , 15, and 16. The index value is assumed to be any of 0, 1, . . . , 14, and 15. In this case, the base station requires an information amount of two bits for notifying the mobile station of a power offset amount. The base station requires an information amount of four bits for notifying the mobile station of a repetition count. The base station requires an information amount of four bits for notifying the mobile station of an index value.

Therefore, in the case of notification of the index value depicted in FIG. 17, since four bits are required for the notification of the index value and eight bits are required for the notification of the power offset amounts of the four channels, a total of 12 bits are required. In contrast, in the case of notification of the repetition counts for the respective channels depicted in FIG. 18, since 16 bits are required for notification of the repetition counts of the four channels and eight bits are required for the notification of the power offset amounts of the four channels, a total of 24 bits are required.

Therefore, the notification of the index value reduces the number of bits required for notification by half as compared to the case of notification of the repetition counts for each channel. If the number of channels further increases, the number of bits required for notification of the index value does not change while the number of required bits increases in the case of notification of the repetition counts for each channel and therefore, the sufficient number of bits required for notification of the index value is equal to or less than a half of the number of bits required for notification of the repetition counts for each channel. As described above, the notification of the index value can reduce the number of bits required for notification as compared to the case of notification of the repetition counts for each channel.

Although a terminal that wirelessly communicates with a base station is a mobile station in the examples described above, the terminal may be fixed at a certain position without moving.

The base station, the mobile station, the wireless communications system, and the wireless communications method provide an effect that a base station can efficiently notify a mobile station of information necessary for signal reception.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station that communicates with a mobile station by using a plurality of physical channels, the base station comprising:
   a transmitter configured to transmit a first signal to the mobile station;
   a receiver configured to receive a second signal transmitted by the mobile station; and
   a controller configured to acquire information generated by the mobile station according to reception state of the first signal; wherein,
   the transmitter is further configured to transmit a third signal including an index value indicating a repetition count for a fourth signal which is transmitted by the mobile station using a physical channel from among the plurality of physical channels, the index value based on the information acquired by the controller.

2. The base station according to claim 1, wherein the receiver is further configured to receive the fourth signal transmitted by the mobile station using a Physical Uplink Shared Channel (PUSCH).

3. The base station according to claim 1, further comprising a table configured with a plurality of index values associated with a plurality of repetition count reference values, a plurality of reception information values, and a plurality of repetition count correction values.

4. The base station according to claim 3, wherein each of the plurality of index values corresponds with each of the plurality of physical channels, wherein the reference value is corrected according to a power offset value.

5. The base station according to claim 1, wherein the transmitter is further configured to transmit a fifth signal including a power offset amount for changing a transmission power of the fourth signal.

6. A mobile station that communicates with a base station by using a plurality of physical channel, the mobile station comprising:
   a receiver configured to receive a first signal transmitted by the base station;
   a controller configured to generate information according to reception state of the first signal; and
   a transmitter configured to transmit second signal including the generated information, wherein
   the receiver is further configured to receive a third signal including an index value indicating a repetition count for a fourth signal which is transmitted from the transmitter using physical channel from among the plurality of physical channel, the index value based on the generated information.

7. The mobile station according to claim 6, wherein the transmitter repeatedly transmits the fourth signal according to the index value.

8. The mobile station according to claim 6, wherein the transmitter is configured to transmit the fourth signal using a Physical Uplink Shared Channel (PUSCH).

9. The mobile station according to claim 6, further comprising:
   a table configured with a plurality of index values associated with a plurality of repetition count reference values, a plurality of reception information values, and a plurality of repetition count correction values, wherein each of the plurality of index values is associated with each of the plurality of physical channels.

10. The mobile station according to claim 9, wherein the transmitter is further configured to transmit a fifth signal including a power offset value for changing a transmission power of the fourth signal.

11. The mobile station according to claim 10, wherein the repetition count reference value is corrected based on the power offset value.

12. A wireless communication system comprising:
   a base station that communicates with a mobile station by using a plurality of physical channels, the base station comprising:
   a first transmitter configured to transmit a first signal to the mobile station;
   a first receiver configured to receive a second signal transmitted by the mobile station; and
   a first controller configured to acquire information generated by the mobile station according to reception state of the first signal,
   the mobile station comprising:
   a second receiver configured to receive a first signal transmitted by the base station;
   a second controller configured to generate information according to reception state of the first signal; and
   a second transmitter configured to transmit the second signal including the generated information, wherein
   the first transmitter is further configured to transmit a third signal including an index value indicating a repetition count for a fourth signal which is transmitted from the mobile station using a physical channel from among the plurality of physical channels, the index value based on the information acquired by the first controller.

13. The wireless communication system according to claim 12, wherein
   the second receiver is further configured to receive the third signal and
   the second transmitter is further configured to repeatedly transmit the fourth signal according to the index value.

14. The wireless communication system according to claim 13, wherein the second transmitter is further configured to transmit the fourth signal using a Physical Uplink Shared Channel (PUSCH).

* * * * *